United States Patent
Lin et al.

(10) Patent No.: US 11,064,443 B1
(45) Date of Patent: Jul. 13, 2021

(54) APPARATUS AND METHOD FOR MANAGING THE EXPOSURE TO ELECTRIC AND MAGNETIC FIELDS (EMF)

(71) Applicant: Samsung Electronics Co., Ltd., Suwon-si (KR)

(72) Inventors: Zinan Lin, Basking Ridge, NJ (US); Suman Das, Belle Mead, NJ (US); Caglar Tunc, Rutherford, NJ (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/115,653

(22) Filed: Dec. 8, 2020

Related U.S. Application Data

(60) Provisional application No. 63/056,196, filed on Jul. 24, 2020, provisional application No. 63/055,655, filed on Jul. 23, 2020.

(51) Int. Cl.
*H04W 52/22* (2009.01)
*H04B 7/0426* (2017.01)

(52) U.S. Cl.
CPC ........ *H04W 52/225* (2013.01); *H04B 7/0426* (2013.01)

(58) Field of Classification Search
CPC ............................ H04W 52/225; H04B 7/0426
See application file for complete search history.

(56) References Cited

U.S. PATENT DOCUMENTS

| 10,820,277 | B2* | 10/2020 | Kang | H04W 52/50 |
| 2010/0273518 | A1* | 10/2010 | Suzuki | H04W 52/30 |
| | | | | 455/522 |
| 2013/0157680 | A1* | 6/2013 | Morita | H04W 72/082 |
| | | | | 455/452.2 |

OTHER PUBLICATIONS

The International Electrotechnical Commission (IEC), International Standard, "Determination of RF field strength, power density and SAR in the vicinity of radiocommunication base stations for the purpose of evaluating human exposure," IEC 62232:2017 © IEC 2017, Geneva, Switzerland, Aug. 2017, 520 pages.

* cited by examiner

*Primary Examiner* — Dominic E Rego

(57) ABSTRACT

Apparatuses and methods for managing electromagnetic field (EMF) radiation. A method includes determining one or more radiation power related parameters, the one or more radiation power related parameters including precoding vectors selected for transmission on a transmission time interval (TTI) basis, a transmit power, and resource block (RB) utilization. The method also includes estimating, based on the one or more radiation power related parameters, a time-averaged radiation power over a predefined time window in azimuth and elevation dimensions. The method also includes determining a direction of a maximum time-averaged radiation power among the estimated time-averaged radiation power; and adjusting one or more transmission parameters based on determining that the maximum time-averaged radiation power in the direction is higher than a threshold.

20 Claims, 14 Drawing Sheets

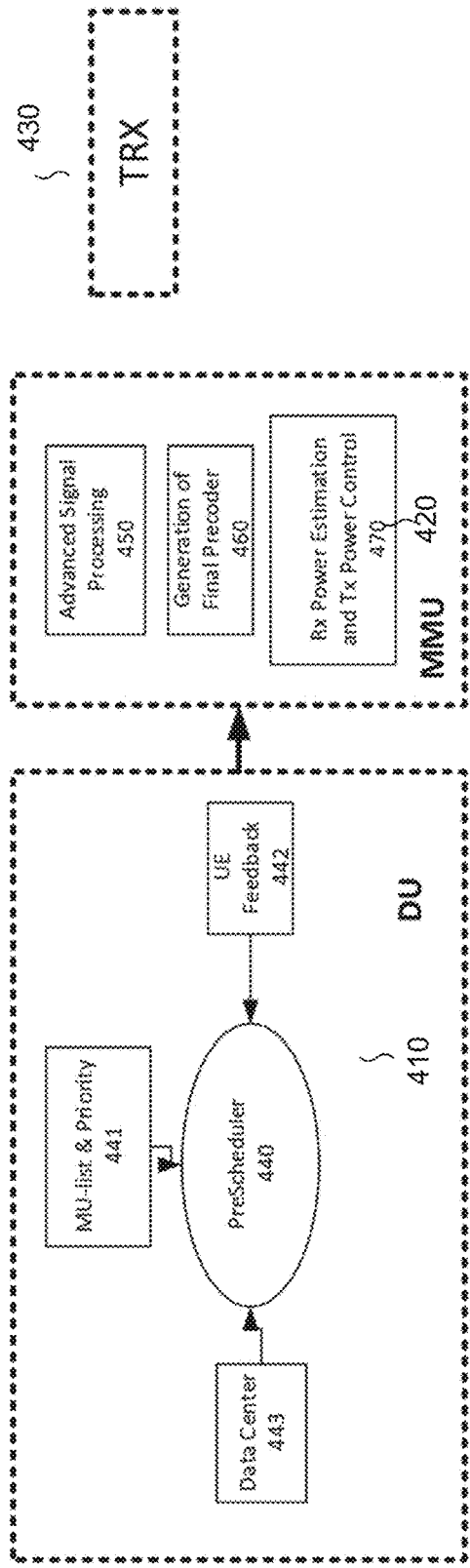
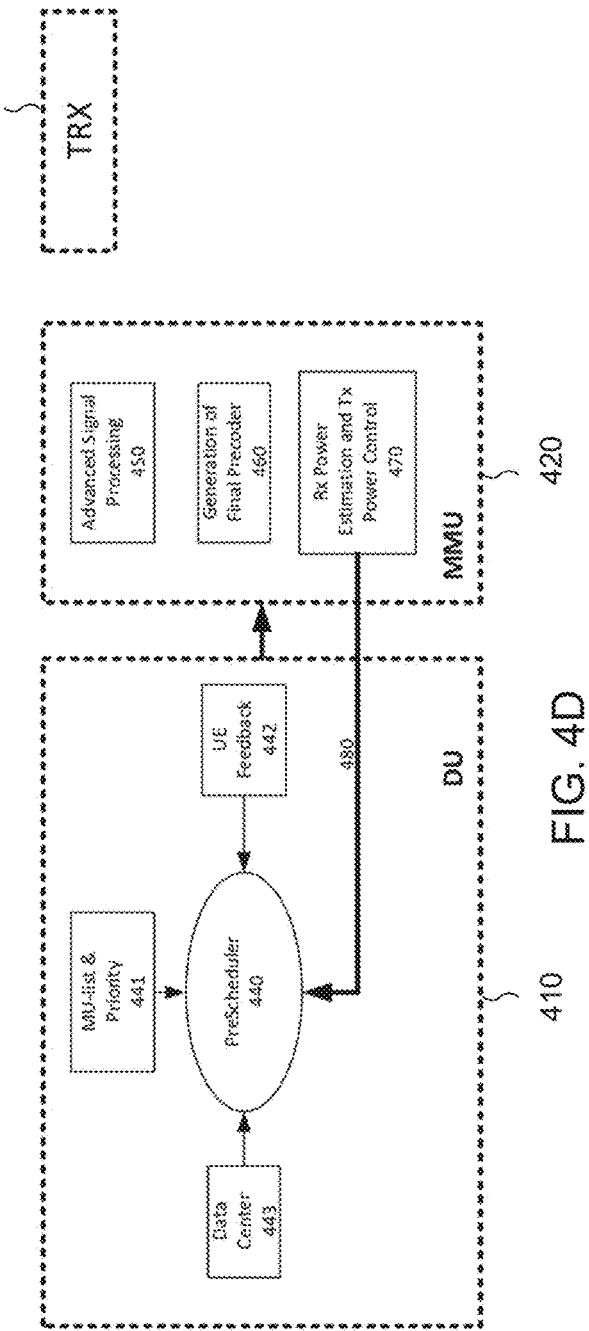
FIG. 4C
FIG. 4D

APPARATUS AND METHOD FOR MANAGING THE EXPOSURE TO ELECTRIC AND MAGNETIC FIELDS (EMF)

CROSS-REFERENCE TO RELATED APPLICATIONS AND PRIORITY CLAIM

This application claims priority under 35 U.S.C. § 119(e) to U.S. Provisional Patent Application No. 63/055,655 filed on Jul. 23, 2020 and U.S. Provisional Patent Application No. 63/056,196 filed on Jul. 24, 2020. The above-identified provisional patent applications are hereby incorporated by reference in their entirety.

TECHNICAL FIELD

This disclosure relates generally to wireless networks. More specifically, this disclosure relates to complying with regulations of exposure to electric and magnetic fields (EMF).

BACKGROUND

The International Commission on Non-Ionizing Radiation Protection (ICNIRP) establishes guidelines for limiting EMF exposure. These guidelines are intended to provide protection against adverse health effects that may be caused by EMF exposure. Country specific regulations may set exposure limits for that country. EMF exposure levels in wireless networks should comply with applicable exposure limits and regulations. Solutions that meet the requirements of each country's regulations are critical to selling products in these countries.

SUMMARY

This disclosure provides methods and apparatuses for complying with EMF exposure related regulations.

In a first embodiment, a base station for managing EMF radiation in a wireless communication system is disclosed. The base station comprises a transceiver and a processor, operably connected to the transceiver. The processor is configured to determine one or more radiation power related parameters, the one or more radiation power related parameters including precoding vectors selected for transmission on a transmission time interval (TTI) basis, a transmit power, and resource block (RB) utilization. The processor is also configured to estimate, based on the one or more radiation power related parameters, a time-averaged radiation power over a predefined time window in azimuth and elevation dimensions. The processor is further configured to determine a direction of a maximum time-averaged radiation power among the estimated time-averaged radiation power, and adjust one or more transmission parameters based on determining that the maximum time-averaged radiation power in the direction is higher than a threshold.

In a second embodiment, a method for managing EMF radiation is disclosed. The method includes determining one or more radiation power related parameters, the one or more radiation power related parameters including precoding vectors selected for transmission on a TTI basis, a transmit power, and RB utilization. The method also comprises estimating, based on the one or more radiation power related parameters, a time-averaged radiation power over a predefined time window in azimuth and elevation dimensions. The method further comprises determining a direction of a maximum time-averaged radiation power among the estimated time-averaged radiation power. The method further comprises adjusting one or more transmission parameters based on determining that the maximum time-averaged radiation power in the direction is higher than a threshold.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which like reference numerals represent like parts:

FIG. 4C illustrates an exemplary MMU enabled operation architecture according to this disclosure;

FIG. 4D illustrates an exemplary MMU enabled feedback operation architecture according to this disclosure;

Figure 1:
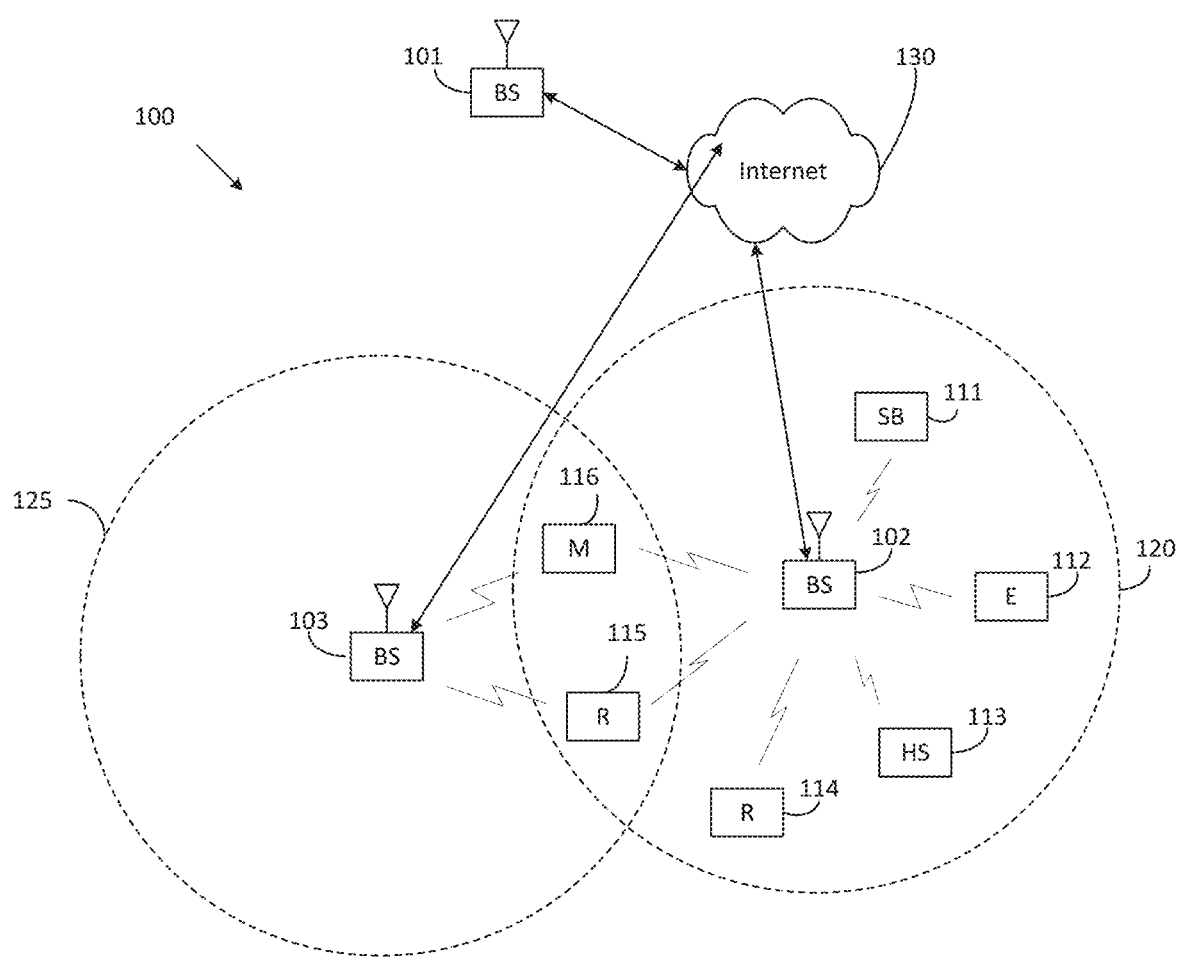
FIG. 1 illustrates an example wireless network according to this disclosure.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Mobile telecommunication technologies (e.g. mobile phones) transmit and receive radiofrequency electromagnetic fields (RF EMFs) in defined ways that allow for communication between devices. As described above, ICNIRP establishes guidelines for limiting EMF exposure. These guidelines are intended to provide protection against known adverse health effects. EMF exposure levels should comply with applicable exposure limits and regulations.

Under regulation requirements, within a bandwidth, the received power density at any location may need to be less than a given value. The received power density may be the radiated power per unit area (e.g., $m^2$). The received power density may also be averaged over a time period that is dependent on the frequency of the radiation. The constraint of the received power can be expressed as follows. For example, when T=6 minutes=3.6*10$^5$ ms, RegP=10 W/m$^2$.

$$\frac{1}{T}\sum_{t=t_0}^{t_0+T} RxPwr < RegP \text{ for any location within } 1m^2 \quad (1)$$

The constraints mentioned above are contradictory to traditional designs. For example, traditional designs optimize performance with the constraints of the total power, while EMF regulations limit the power usage due to radiation power concerns.

Certain embodiments of this disclosure provide an architecture for scenarios in which power optimization of the received power may be required.

Certain embodiments of this disclosure provide the novel algorithms to optimize the radiation power to meet EMF regulation.

Certain embodiments of this disclosure implement a new function to a base station(s), which monitors the radiation power at the compliance distance, and triggers the power control algorithms when the potential radiation power is larger than the regulation.

Certain embodiments of this disclosure provide the novel algorithms that achieve the optimal trade-off between the user experience and the received power limitation.

Certain embodiments of this disclosure propose smart multi-user, multiple-input and multiple output (MU-MIMO) scheduling algorithms which consider the joint optimization of assigned power, modulation coding scheme (MCS), and commonly scheduled layers, without implementing the advanced signal processing of the channel matrix.

Certain embodiments of this disclosure provide new criterion to switch between MU-MIMO and single-user, multiple-input and multiple output (SU-MIMO) mode for optimizing the throughput performance without violating the received power regulation.

Certain embodiments of this disclosure provide multiple methods to estimate the radiation power for different MU-MIMO schemes. For example, sounding reference signals (SRS) based zero forcing (ZF) MU-MIMO, SRS based non-ZF MU-MIMO, PMI based ZF MU-MIMO, PMI based non ZF MU-MIMO, and more. The methods include online calculation and online PMI to grid mapping table look up(s).

Certain embodiments of this disclosure provide power estimation mechanisms that can be performed in the data unit (DU), which may help reduce complexity.

Certain embodiments of this disclosure illustrate multiple strategies for performing PMI to grid mapping.

Certain embodiments of this disclosure disclose methods to estimate the radiation power without the final precoder information for ZF MU-MIMO.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, a new function has been added to the base station(s) (e.g. 101-103), which monitors the radiation power at the compliance distance, and triggers the power control algorithms when the potential radiation power is larger than the regulation.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
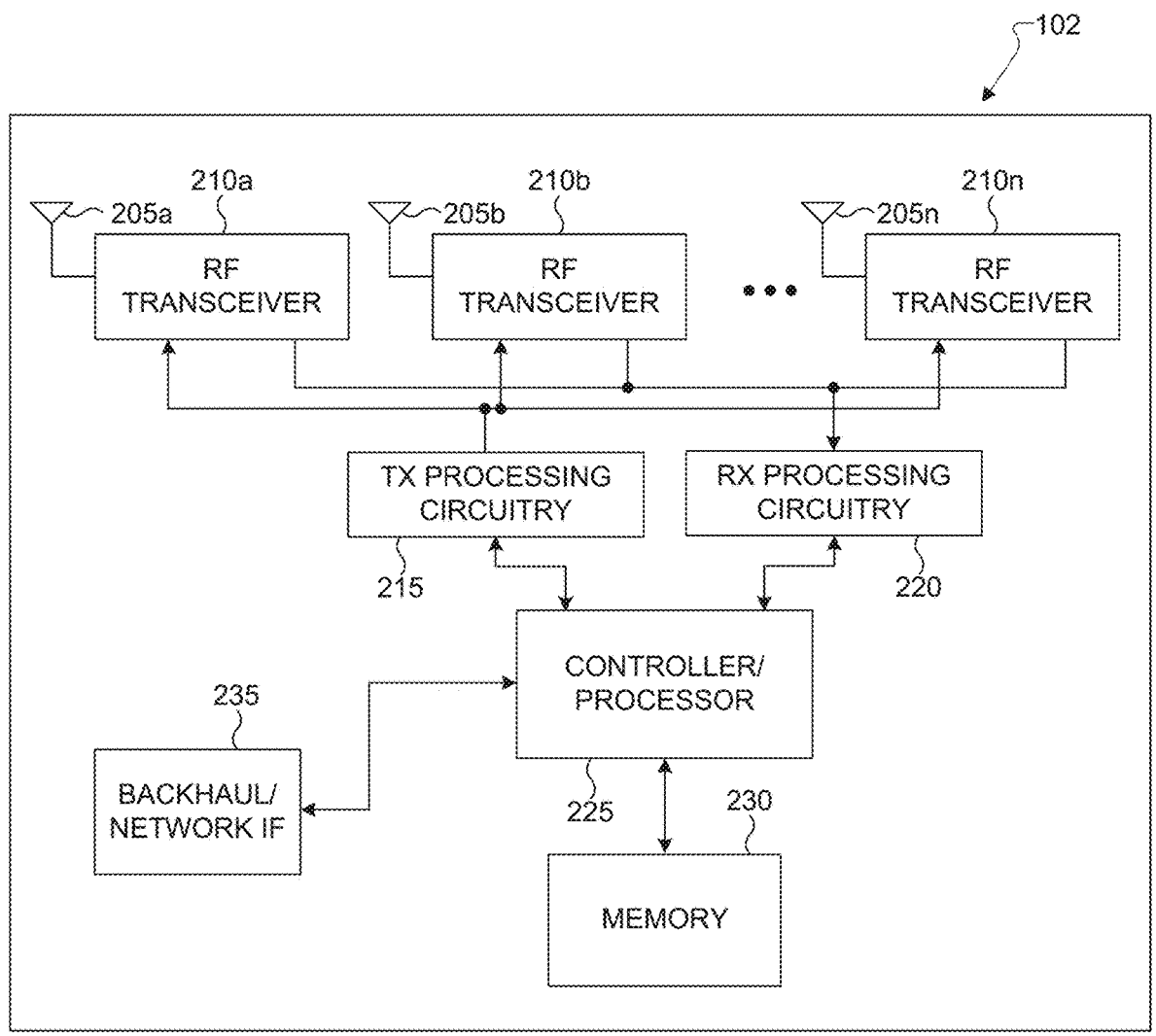
FIG. 2 illustrates an example gNB according to this disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, certain embodiments of this disclosure provide multiple methods to estimate the radiation power for different MU-MIMO schemes. For example, SRS based ZF SRS based non-ZF MU-MIMO, PMI based ZF MU-MIMO, PMI based non ZF MU-MIMO, and more. The methods include online calculation and online PMI to grid mapping table look up.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
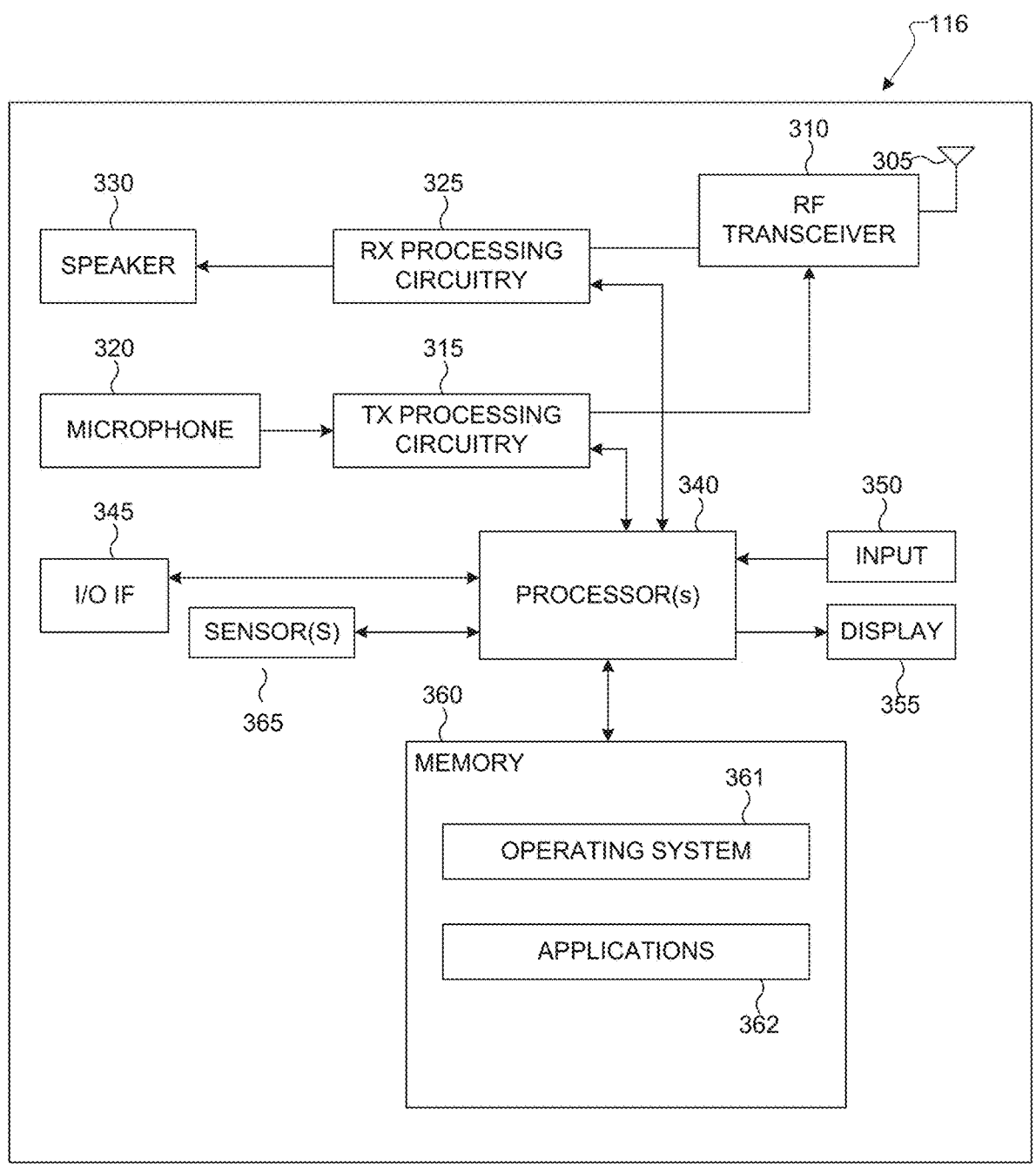
FIG. 3 illustrates an example user equipment (UE) according to this disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, input 350, a display 355, a memory 360, and sensor(s) 365. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355. The operator of the UE 116 can use the input 350 to enter data into the UE 116. The input 350 can be a keyboard, touchscreen, mouse, track ball, voice input, or other device capable of acting as a user interface to allow a user in interact with the UE 116. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity. In certain embodiments, the input 350 includes the antenna 305 which can emit and recite radar signals for authenticating a user.

The display 355 may be a liquid crystal display, light emitting diode display, or other display capable of rendering text and/or at least limited graphics, such as from web sites, videos, games, images, and the like. The display 255 can be sized to fit within an HMD. The display 355 can be a singular display screen or multiple display screens capable of creating a stereoscopic display. In certain embodiments, the display 255 is a heads-up display (HUD).

The memory 360 is coupled to the processor 340. Part of the memory 360 could include a random-access memory (RAM), and another part of the memory 360 could include a Flash memory or other read-only memory (ROM). The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can sensitive and confidential information, which require user authentication prior to accessing.

UE 116 may further include one or more sensors 365 that can meter a physical quantity or detect an activation state of the UE 116 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein. Any of these sensor(s) 365 may be located within UE 116, within a secondary device operably connected to UE 116, within a headset configured to hold the UE 116, or in a singular device where UE 116 includes a headset.

As described in more detail below, some approaches are UE 116 dependent. For example, UEs 116 may be classified into multiple groups, and different power reduction levels may be applied to different groups of UEs based on classification criteria.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Systems and methods that are configurable to meet EMF related regulations are disclosed herein. To implement these solutions, it is important to have an accurate and efficient algorithm that estimates the radiation power at any distance so that the country specific EMF regulation(s) can be met.

Current base stations may contain two separate units. One may be a DU while the other is a massive MIMO (MMU). Modern MMU base stations (e.g., 101-103) often use a split architecture with certain functionalities being performed in the MMU while others are performed in the data/distributed unit DU.

Figure 4A:
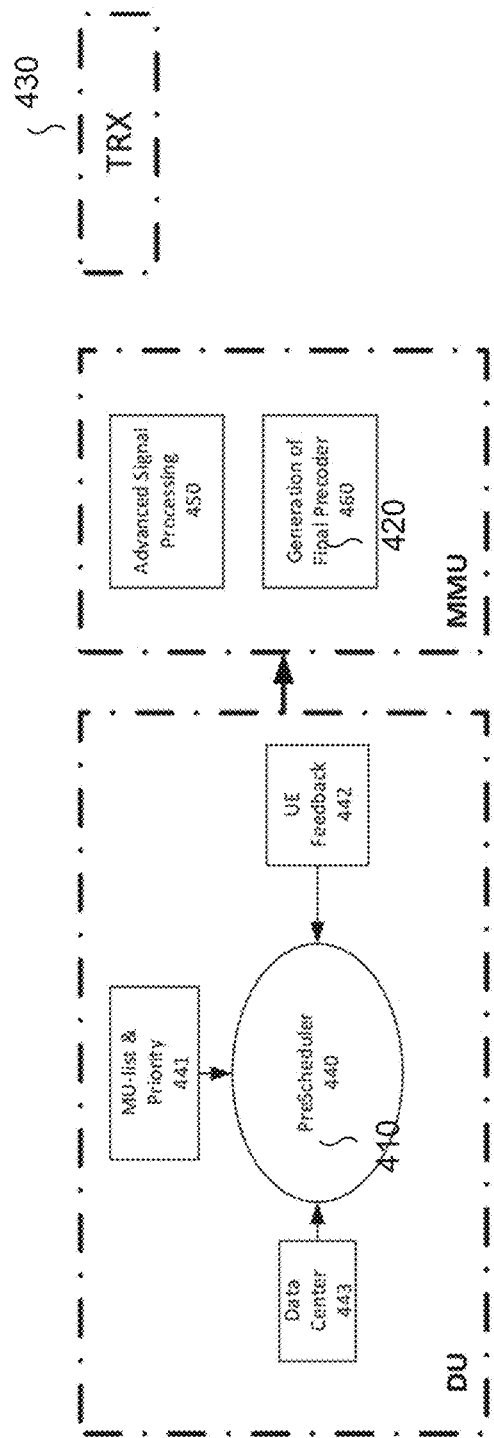
FIG. 4A illustrates an exemplary embodiment of a split architecture for a gNB according to this disclosure.

FIG. 4A illustrates an example of a split architecture for a gNB according to this disclosure. FIG. 4A includes DU 410, MMU 420, and transceiver(s) (TRX) 430. DU 410 performs prescheduling based on multi-user (MU) list 441, received UE feedback 442, and relevant data received from data center 443. DU 410 transmits the determined scheduling data to MMU 420. MMU 420 performs advanced signal processing 450 and generates a final precoder 460.

While the above described architectural separation, as illustrated in FIG. 4A has its advantages in terms of load sharing, multi-tenant hosting, power management etc., this architecture may also impose restrictions in terms of information localization. For example, DU 410 performs pre-scheduling 440, which determines the scheduled UEs (e.g., UE 116) with the assigned MCS, power, layer, etc. Due to complexity restrictions, DU 410 may not be able to access multiple final transmission decisions 460, which are calculated in the MMU 420. For example, the final scheduled UEs, final transmission power, scheduled precoder in each sub-band for each UE 116, scheduled MCS for each UE 116, etc. The limitations mentioned above may cause the radiation power estimation and tracking to be more challenging for DU 410.

For example, the scheduling and various (radio resource management) RRM decisions may be made solely at the DU 410 and only pertinent information may be shared with the MMU 420. A number of advanced signal processing operations 450 are performed only at MMU 420. For example, the number of users and the layers paired at any transmission time interval (TTI) may be decided at DU 410, but the final precoding vectors 460 for actual transmission may only be known at MMU 420. MMU 420 may not be able to influence a DU 410 in its decision-making process, and the final transmitted precoder information 460 may not be known by DU 410.

To comply with additional EMF regulations, certain added functionalities are needed. Systems and methods illustrating an eNB/gNB using a power estimation to determine a resource adjustment are disclosed. In the following examples, several alternative locations to host these added functionalities are provided.

The following architectural proposals illustrate examples of the procedures in which an eNB/gNB may implement EMF algorithms in different ways.

Figure 4B:
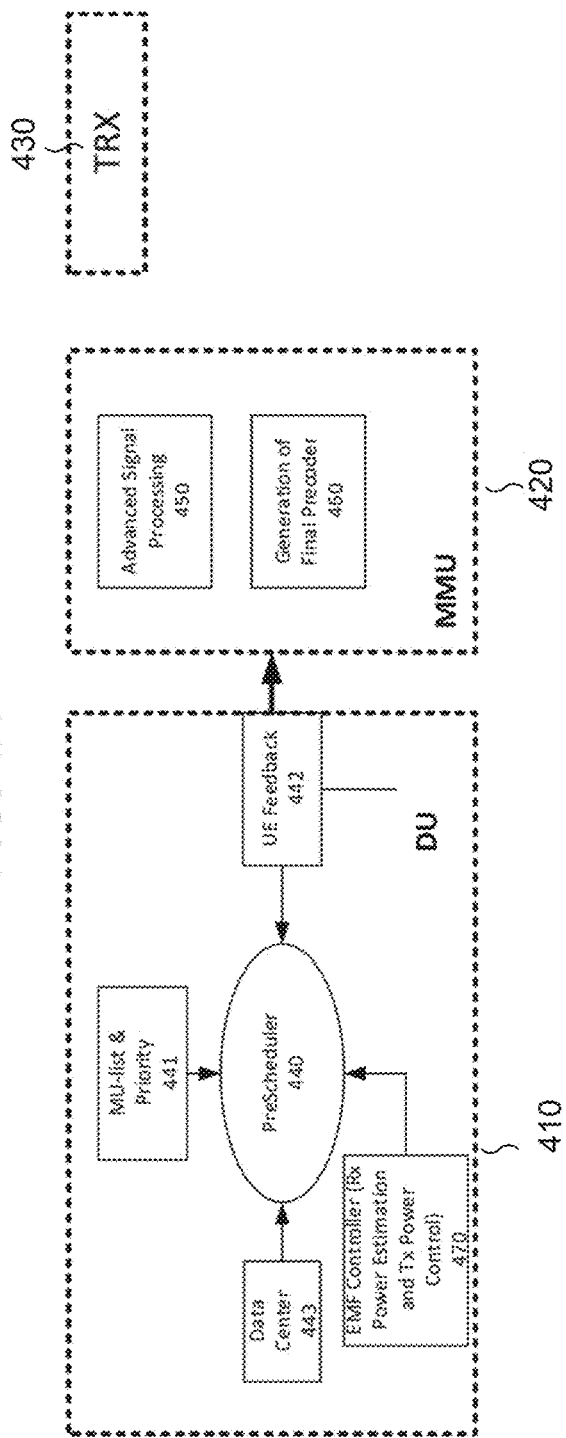
FIG. 4B illustrates an exemplary DU enabled operation architecture according to this disclosure.

In accordance with certain embodiments in this disclosure, an EMF controller 470 may be added to the eNB/gNB environment. FIG. 4B illustrates a DU 410 enabled operation architecture according to this disclosure. In this embodiment, DU 410 may estimate the impact of transmission at different azimuth and elevation directions through EMF controller 470. EMF controller 470 may perform, $R_x$ power estimation and $T_x$ power control, irrespective of whether a UE 116 is present at that location. DU 410 may also maintain a running average of the two-dimensional (2-d) heat map in the azimuth and elevation directions. This constraint may be used by the pre-scheduler 440 at each TTI to select UEs, number of layers, power at each layer, and the appropriate MCS to assign.

Advantages to this configuration may include the ability to reuse the existing functionality of MMU technology, joint optimization of transmitted power, a number of layers, and MCS assignment based on the estimate of the peak received power by DU 410. While this design is more simplified, the design may not provide accurate estimation of the received power of any location within the cell. Further, with the configuration of FIG. 4B, a more conservative scheduling decision from the DU 410 may need to be implemented.

FIG. 4C illustrates an MMU 420 enabled operation architecture according to this disclosure. In this architecture configuration, MMU 420 may have the complete information regarding the final transmit steering vectors for all users per resource block (RB) through the generation of the final precoder 460. The MMU 420 may compute and maintain an accurate temporal average of radiated energy patterns along different azimuth-elevation directions through $R_x$ power estimation and $T_x$ power control, as performed by EMF controller 470. By computing and maintaining an accurate temporal average in this manner, the difference between the physical antenna pattern and the antenna's datasheet may be ignored. Any potential violation of an EMF regulated power constraint, in any direction, at any scheduling time, may be mitigated by reducing the overall transmit power envelope and/or not transmitting the offending layer(s).

Advantages to this configuration may include the ability of reusing existing functionality of the current MMU 420 without a significant change to the architecture. However, this embodiment may add additional computational complexity in MMU 420. Further, potential MCS and power override information may not be propagated to the pre-scheduler 440.

FIG. 4D illustrates an MMU 420 enabled feedback operation architecture according to this disclosure. In this configuration, in addition to computing and maintaining a running average of radiated power in each direction, the MMU 420 may periodically, via EMF controller 470, share the heat-map with DU 410, as indicated by 480. The pre-schedular 440 may use this periodic information to update its decision on the user, layer, power, and/or MCS selection.

Advantages to this configuration may include the ability of reusing the existing functionality of the MMU. Further, potential MCS, layer, and power override decisions may be made at the pre-scheduler 440. However, this embodiment may also add additional computational complexity in the MMU 420. This embodiment may also require periodic feedback from the MMU 420 to the DU 410.

In accordance with certain embodiments of this disclosure, a new function in the eNB/gNB environment is disclosed. This new functionality may allow the eNB/gNB the ability to keep track of the (estimated) radiation power at a compliance distance and trigger certain actions when the received power may potentially become higher than regulation power limitations.

As described above, an EMF controller 470 may be added to the eNB/gNB (e.g. gNB 102) environment. The base station may keep track of the radiation power at the given compliance distance. For example, the EMF controller 470 may maintain a two-dimensional (2-d) heat map in the azimuth and elevation directions. The heat map may record the accumulated power in all directions. If the maximum power (among all defined grids) on the 2-d heat map is higher than the regulation power, the eNB/gNB 102 may begin taking actions. The actions may include, but are not limited to, actions relating to transmission power control, resource block group (RBG) allocation, and rescheduling some of the UEs. For example, UEs with certain PMI values may be rescheduled.

The received power level in all azimuth and elevation dimensions, at required compliance distance and/or direction of the maximum power over azimuth and elevation dimensions may be measured by estimation of a regulation threshold breach. In simple terms, the framework described below may include three components: gather, measure, and react (GMR). For example, relevant statistics/counters such as selecting PMIs for transmission on a per TTL bases, transmit power, and/or network load/RB utilization may be gathered.

The EMF controller 470 may react to the potential threshold breach by adjusting one or more parameters. Parameters may be adjusted using a variety of methods described below. a uniform power adjustment, selective power adjustment, uniform resource adjustment, selective resource adjustment, direction EMF control (DEC), and/or re-scheduling UEs with certain PMIs.

RRM algorithms that can be implemented to follow the received power regulation with different performance requirements are also disclosed herein. For example, non-degraded average user throughput, improved cell-edge throughput performance, etc. Multiple exemplary embodiments for reducing the radiated power in response to the EMF controller 470 indicating that the radiated power could be potentially higher than the regulation are disclosed herein.

In the following examples, various configurations of applying a power reduction or a resource reduction are enclosed. These include: a uniform power adjustment, selective power adjustment, automatic dynamic power reduction, uniform resource adjustment, selective resource adjustment, and adaptive RB reduction.

In accordance with certain embodiments in this disclosure, a uniform power reduction may be applied in response to the EMF controller 470 indicating that the radiated power could be potentially higher than the regulation threshold. In this embodiment, the transmit power for all UEs 116 may be reduced by the same amount, for example, by a certain percentage.

In accordance with certain embodiments in this disclosure, a selective power reduction may be applied in response to the EMF controller 470 indicating the radiated power could be potentially higher than the regulation threshold. The selective power reduction is a UE 116 dependent power allocation. This option may classify UEs 116 into multiple groups. Different power reduction levels may be applied to different groups of UEs 116. Classification criteria may be based on, for example, the UE's 116 current performance. The UE's 116 current performance may depend on, for example, offered traffic size, the initial block error rate (iBLER), the data rate, the reported channel quality indication (CQI) and/or the reference signal received power (RSRP), and/or any other applicable performance criteria.

In the selective power configuration, UEs 116 may be classified into multiple groups. For example, UEs 116 may be classified into two groups. In this example, no reduction of power may be applied to a first group of UE's (Group 1) while a second group of UEs' (Group 2) power may be reduced by a pre-determined percentage. When the first group of UEs 116 are commonly scheduled, the transmit power may be set to the original value or to a previous value. That is, the transmit power (TxP), measured in Watts, may be set to the original transmit power (TxP_orig), and equally distributed over all UEs 116 in the group (i.e., Group 1). When the second group of UEs 116 are commonly scheduled, the transmit power may be reduced by a percentage (x %) of the previous value(s); i.e., TxP=TxP_orig*(1-x %), and equally distributed over all users.

The example described above of classifying the UEs into two groups is for explanatory purposes, and this disclosure is not in any way limited to two groups. For example, number of groups may be extended to N, where N>2 groups. In each group, the transmit power may be reduced by x1%, x2%, . . . , xN % of the previous value supplied.

Multiple options may be available based on the number of users (N) in each group. In a first example, N1 Group1 users and N2 Group2 users are commonly scheduled. For example, the total transmit power allocated to each user may be set to the original value, i.e. TXP_orig, and distributed over all users. That is, the total transmit power (in Watts) allocated to each user=TxP_orig/(N1+N2).

In a second example, the total transmit power may be set to the reduced power; i.e., TxP_orig(1-x %) and equally distributed over all users. In other words, TxP_orig(1-x %)/(N1+N2) Watts may be allocated to each user.

In a third example, an unequal power allocation over Group 1 users and Group 2 users may be applied. For example, each Group 1 user may be allocated with TxP_orig/(N1+N2) Watts of power and each Group 2 user may be allocated with TxP_orig*(1-x %)/(N1+N2) Watts of power. The total transmit power will be (N1+N2−N2*x %)TxP_orig Watts.

In accordance with certain embodiments in this disclosure, an automatic dynamic power reduction may be applied in response to the EMF controller 470 indicating the radiated power could be potentially higher than the regulation threshold. In this example, the power reduction may be dynamically changed over time based on predefined criteria. For example, the following algorithm may be applied to automatically find power set point for all users.

Init( )
S1=set of all users in the system
P1=full power for all users
Run( )
Iterate till regulation criteria met
Reduce power by $\delta_P$ dB for all users in set S1
P1=P1−$\delta_P$ (in dB)
S2=set of users identified to be in "No-power reduction" group
Reset user power for S2 back to P1
S1=S1\S2;

In accordance with certain embodiments in this disclosure, a uniform RBG reduction may be applied in response to the EMF controller 470 indicating the radiated power could be potentially higher than the regulation threshold. That is, RBG usage for all UEs 116 and TTL's may be reduced.

In accordance with certain embodiments in this disclosure, a selective RBG reduction may be applied in response to the EMF controller indicating the radiated power could be potentially higher than the regulation threshold. That is, non-traffic based RBG allocation may be applied to selective UEs.

In selective RBG reduction configuration, UEs 116 may be classified into multiple groups. For example, UEs 116 may be classified into two groups, Group 1 and Group 2. For the Group 1 UEs, reduced RBG usage for the required traffic may be applied at certain TTIs, or whenever they are scheduled, i.e., the number of allocated RBGs is x % of the required RBGs. For the Group 2 UEs, full RBG allocation may be applied in all transmissions; i.e., the RBG allocation is based on the offered traffic.

Similar to the selective power adjustment configuration, the classification criteria of UE 116 groups for RBG reduction may be iBLER, reported CQI or RSRP, etc.

The example described above is based on classifying the UEs 116 into groups for explanatory purposes, and this disclosure is not in any way limited to two groups. The number of groups may be extended to N, where N>2 groups. In each group, the allocation may be x1%, x2%, ..., xN % of the RBGs required by the offered traffic, respectively.

In accordance with certain embodiments in this disclosure, an adaptive RB reduction may be applied in response to the EMF controller indicating the radiated power could be potentially higher than the regulation threshold. In this embodiment, less than required RBGs are allocated to commonly scheduled UEs at certain TTIs.

In the adaptive RB reduction configuration, preconfigured conditions may be set to trigger an RB reduction. For example, when the number of times that a group of UEs are commonly scheduled is larger than a threshold, the RB reduction may be triggered when this group of UEs are commonly scheduled. When this condition or another preconfigured condition is met, a restricted RB allocation algorithm for commonly scheduled UEs may be applied.

For example, the RBs for all commonly scheduled UEs whenever the preconfigured condition is met may be applied. Another option may be to apply unequal RB allocations to commonly scheduled UEs when a preconfigured condition is met. One example of an unequal RB allocation configuration may be to only restrict RB usage for some of the commonly scheduled UEs while allocating the full RBs required by the traffic to other commonly scheduled UEs.

In addition to the power/resource reduction examples provided above, other configurations are also available. These include direction specific and resource specific reduction options, dynamic numerology change, traffic specific dynamic power and resource reduction, and load balancing options.

In accordance with certain embodiments in this disclosure, direction specific power and/or direction specific resource reduction may be applied in response to the EMF controller indicating the radiated power could be potentially higher than the regulation threshold. In this configuration, the DU 410 may be able to predict the maximum received power and its direction without performing the channel matrix inversion. When the estimated maximum received power is larger than the regulation, any combination of the following alternatives action may be applied: directional power reduction, directional RB reduction, re-selecting commonly scheduled UEs, or switching from MU-MIMO to SU-MIMO.

One example of a directional power reduction may be to reduce power of the UEs with certain PMIs or channel conditions. One example of the directional RB reduction may be reducing the RB assignment for the UEs with certain PMIs or channel conditions. One example of re-selecting commonly scheduled UEs may be avoiding scheduling UEs with certain PMIs or channel conditionals.

In accordance with certain embodiments in this disclosure, a dynamic numerology change configuration may be applied in response to the EMF controller 470 indicating the radiated power could be potentially higher than the regulation threshold. In this method, the slot length or slot format can be adapted to the determined power assumption.

In accordance with certain embodiments in this disclosure, a traffic specific dynamic power and resource reduction configuration may be applied in response to the EMF controller indicating the radiated power could be potentially higher than the regulation threshold. In this configuration, the transmission power may be reduced, based on the offered traffic size. For example, to minimize degradation of the UE experience, no RB/power reduction is allowed for a small packet(s).

In accordance with certain embodiments in this disclosure, a load balancing configuration may be applied in response to the EMF controller indicating the radiated power could be potentially higher than the regulation threshold. In this configuration, the transmission power may be reduced, based on the offered traffic size. Improved load-balancing across sectors and carriers may be realized in order to harmonize user distribution. To minimize the coverage hole due to the reduced transmission power, eNB/gNB may trigger the load-balancing algorithm to move users to other carriers or to other sectors.

In the following section, procedures regarding how eNB/gNB uses the measurement to determine whether the power adjustment follows the regulation are disclosed. For example, a regulation requirement may be that the power density (averaged over 6 mins) should be lower than a threshold. This procedure may be extended to other resource adjustment to meet any power constraint, e.g., RBG adjustment.

One method is a single interval power determination. In this method, the maximum grid power (across the elevation and azimuth direction) in the checking period i−1 to determine the backoff factor for the checking period i. For example, there are N+1 checking periods within the defined averaged time window, e.g., 6 minutes. This method is to make sure that the power density within each checking period, N, complies with the regulation, as shown in FIG. 5A.

Figure 5A:
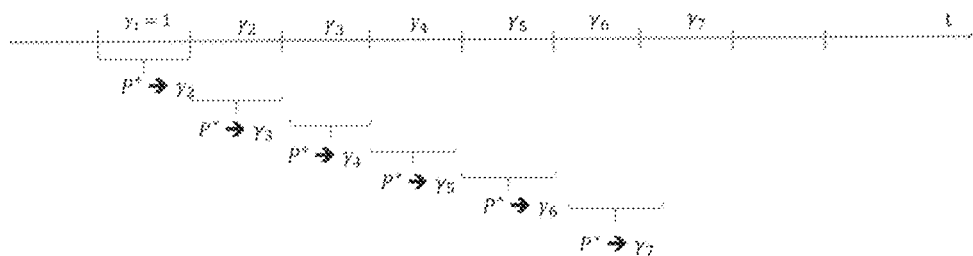
FIG. 5A illustrates an exemplary single interval power determination protocol, according to this disclosure.

With reference to FIG. 5A, one implementation of a single interval power back off determination method is illustrated below. This illustration assumes that the entire sector is divided into M grid points (in elevation and azimuth domain). If the maximum grid beam gain is:

$$G_{\max}(i-1) = \max_{m} G_m(i-1) \qquad (2)$$

Where $G_m(i-1)$ is the average beam gain over the checking period i−1 on grid m; and P reg is the regulation power density required at distance d. The backoff factor can be computed as:

$$\gamma_i = \frac{P_{reg}}{P^*} = \frac{P_{reg}}{\frac{G_{\max}(i-1) * P_{tx}(i-1)}{4 * \pi * d^2 * \gamma_{i-1}} \gamma_B} \qquad (3)$$

$\gamma_B$ is the additional backoff parameter, which compensates the inaccurate prediction of the beam gain in period i using the beam gain in the period i-1. $P_{tx}(i-1)$ is the transmit power in the check period i-1. One checking period may contain multiple TTIs (e.g., 500 TTIs). $\gamma_i$ is the power adjustment factor applied in the checking period i. In other words, the transmission power in the checking period i is $P_{tx}\gamma_i$, where $P_{tx}$ is the full transmit power.

Figure 5B:
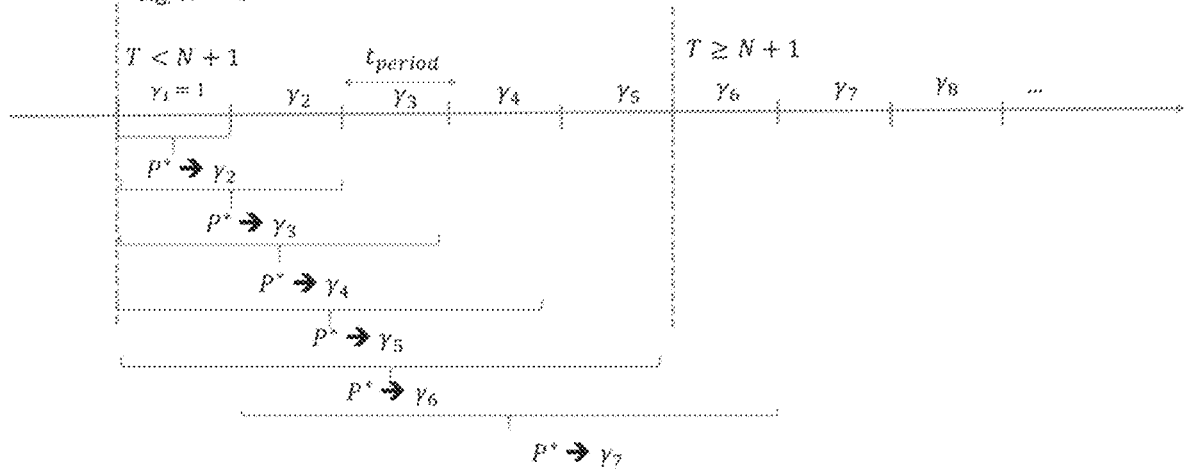
FIG. 5B illustrates an exemplary multi interval power determination protocol, according to this disclosure.

Another method illustrating how eNB/gNB 102 uses the measurement to determine whether the power adjustment follows the regulation is through a multi-interval power determination. This method may use multi checking periods to obtain the back-off parameter, as illustrated in FIG. 5B. Assuming there are N+1 checking periods within the defined averaged time window, (e.g., 6 minutes), average the power from multiple checking periods, (e.g., <=N) to derive the backoff factor gamma.

In one example, the backoff parameter at period T+1 may be derived from previous T periods as follows:

$$\gamma_{T+1} = \frac{1}{N+1} \sum_{i=T-N}^{T} \gamma_i \frac{P_{reg}}{P_{max}(i)} \gamma_B \quad (4)$$

$$P_{max}(i) = \frac{G_{max}(i) P_{tx}(i)}{4\pi d^2} \quad (5)$$

In another example, the maximum power P across all dimension m's from the previous T periods and derive the backoff parameter at a period T+1 from the power P as follows:

$$P = \max_m \left( \frac{1}{N+1} \sum_{i=T-N}^{T} \frac{P_m(i)}{\gamma(i)} \right) \quad (6)$$

$$\gamma_{T+1} = \frac{P_{reg}}{P} \quad (7)$$

Figure 6:
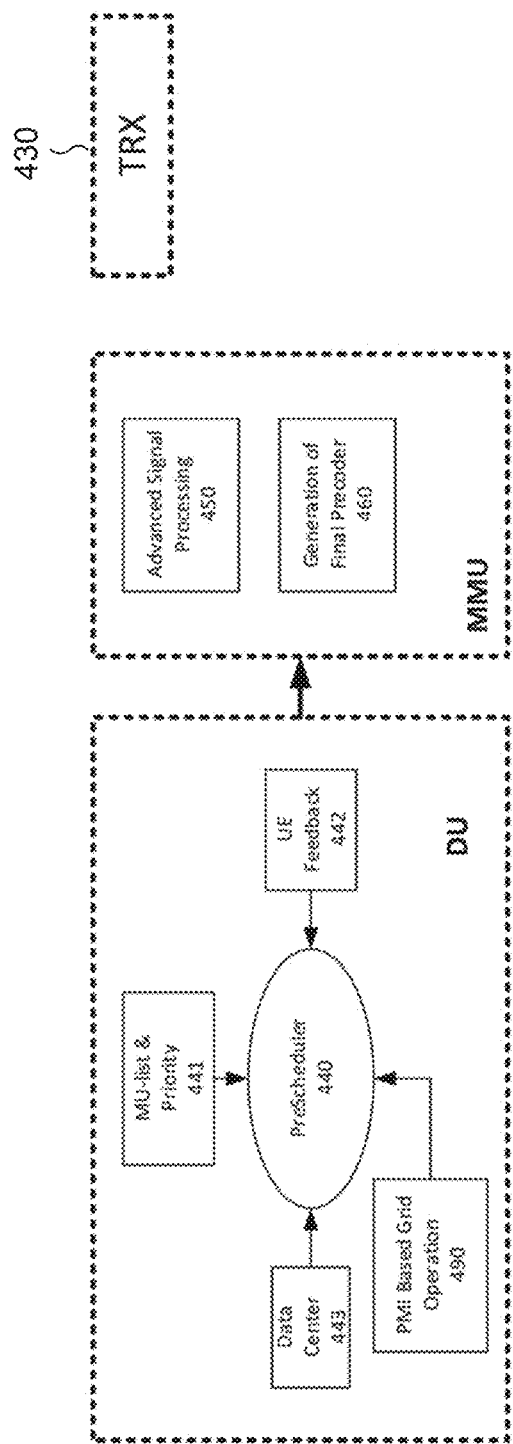
FIG. 6 illustrates an exemplary precoding matrix indicator (PMI) based operation architecture according to this disclosure.

In addition to the configurations described above, other embodiments and configurations to reduce the radiated power in response to the EMF controller 470 indicating that the radiated power may be potentially higher than the regulation, are also disclosed. As described above, an exemplary architecture for estimating radiation power at DU 410 side is illustrated in FIG. 4B. FIG. 6 illustrates an alternative exemplary architecture for estimating radiation power at the DU 410 side. In the exemplary embodiment of FIG. 6, a PMI based operational architecture 490 is disclosed. Given the feedback of the UE's PMI 442, DU 410 may adjust the selected UEs 116 and layers with assigned MCS and transmitted power. In this example embodiment, the PMI assignments for the selected UEs are determined by DU 410.

For example, based on the embodiment of FIG. 6, a user specific power reduction configuration may be combined with a modified MU-MIMO scheduling. In the selective power reduction algorithm described, a modified MU-MIMO scheduling to accommodate unequal transmit power for different group of users is disclosed.

The following example illustrates the configuration above by dividing the users into two groups, i.e., Group 1 users and Group 2 users. In this configuration, Group 1 users are commonly scheduled only with other Group 1 users, and Group 2 users may be commonly scheduled only with other Group 2 users. In other words, a user of Group 1 will not be commonly scheduled with a user of Group 2 and vice versa. First, in the MU-MIMO scheduling, a primary user(s) is determined. If the primary user is a Group 1 user, only Group 1 users may be permitted to be commonly scheduled. If the primary user is a Group 2 user, only Group 2 users may be permitted to be commonly scheduled.

The following section describes several solutions for the estimation under this architectural design including: DU enabled simplified power estimation, grid-based power estimation in MU-MIMO systems, and non-grid-based power estimation in MU-MIMO systems.

Figure 7:
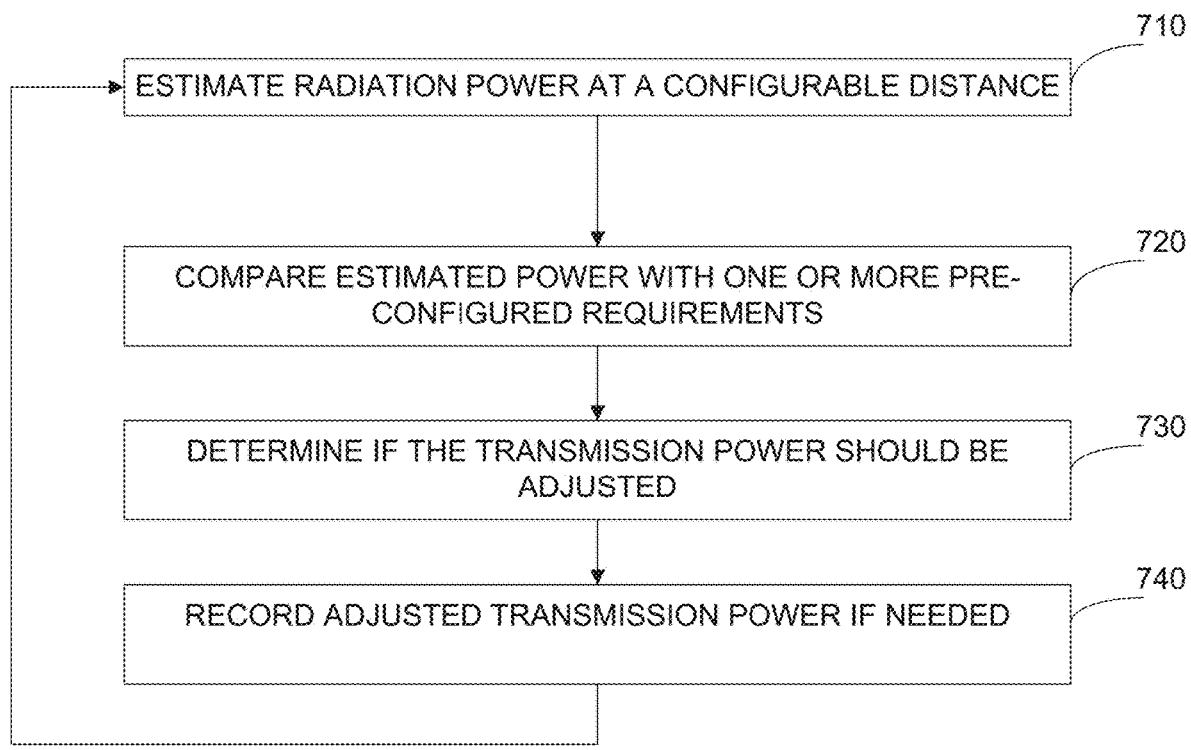
FIG. 7 illustrates a simplified flowchart for a DU enabled power estimation and adjustment.

FIG. 7 illustrates a simplified flowchart for a DU 410 enabled power estimation and adjustment. The embodiment of steps to obtain the method as shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

At step 710, DU 410 estimates the radiation power at a configurable distance. For example, the distance may be the compliance distance required by the operator. Next, at step 720, DU 410 compares the estimated power with one or more pre-configured requirements. For example, the regulation power defined by the operator, the maximum target power at certain distance, etc. At step 730, DU 410 determines if the transmission power should be adjusted. Next, at step 740, DU 410 records the adjusted transmission power if the power adjustment is performed. Once step 640 completes, the method returns to step 710. In other words, steps 710-740 are ongoing.

In the following section of this disclosure, several grid-based power estimation methods in MU-MIMO systems are disclosed. These methods include power estimation in MU-MIMO without zero forcing, power estimation in MU-MIMO with zero forcing, and dynamic grid size and dynamic grid change.

Figure 8:
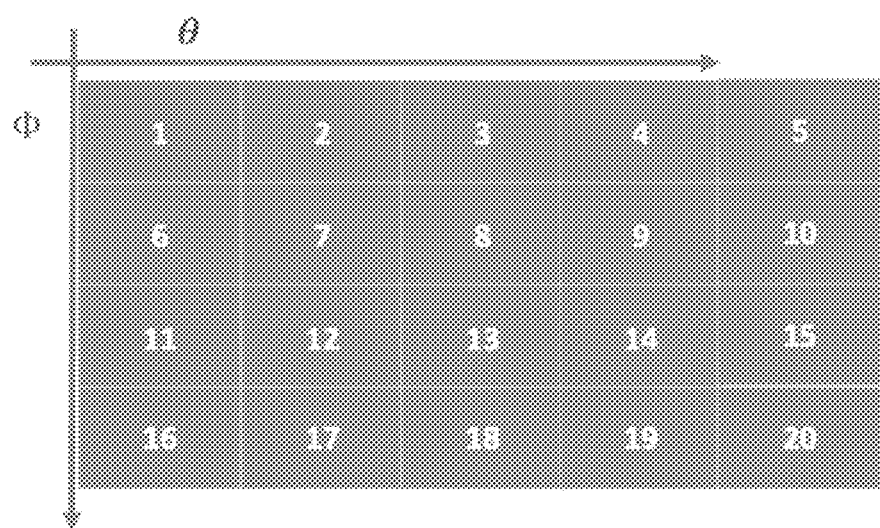
FIG. 8 illustrates an exemplary Grid-based Power Estimation grid according to this disclosure.

FIG. 8 illustrates an exemplary diagram of a grid-based power estimation that may be used in MU-MIMO systems. In the grid-based power estimation of FIG. 8, the power radiation in the azimuth and elevation domains are shown. Multiple grids are generated to show the radiation power distribution from the base station. As illustrated in FIG. 8, the power is recorded in each labeled grid. The power can be an accumulated power over a period of time or the average power over a period of time.

Using the approach described above and depicted in FIG. 8, the full picture of the power distribution in azimuth and elevation domain may be captured. The grid size can be implementation dependent. For example, a smaller number of grids may lead to less computation but more inaccurate estimation of the power in different directions. A larger number of grids may lead to accurate power estimation but may have a larger storage requirement.

Additionally, the approach described above eases the calculation for directional power adjustment. Once the power distribution is known in different directions, the power adjustment can be directional. In other words, the transmitted power may only need to be adjusted for certain directions. For example, the directions in which the radiation power is higher than the regulation.

The approach described above may also add flexibility to the power adjustment. For example, the power adjustment does not need to target all directions and/or all UEs. Only UEs that contribute to the radiation power in the remarked direction are transmitted with the adjusted power. The above described approach may also minimize the system performance loss due to unnecessary power reduction because there is no need to adjust the transmit power for all UEs and in all directions. Due to potential limitations of DU 410, the number of grids may need to be small.

The following section describes various methods to estimating power in MU-MIMO systems without zero forcing. These approaches include using an online calculation to compute the radiation power, using offline generated PMI to grid mapping table to compute the radiation power, and using multiple PMI to grid mapping strategies.

In this example, an online calculation to compute the radiation power from the DU 410 side is disclosed. This approach may be used in different MU-MIMO systems. For example, in SRS based or PMI based systems.

In the above described approach, precoder $w_k$ is used as an input to calculate the transmit power with aggregated beam gain in one RBG, iRBG. For example:

$$P(iRBG) = P \Sigma_k G_{\theta,\phi}(w_k, iRBG), \text{ where:} \quad (8)$$

$w_k$: scheduled PMI (or scheduled channel conjugate) for UE k in the iRBG $h_{\theta,\phi}$: antenna gain in the direction of $(\theta,\phi)$ $G_{\theta,\phi}(w_k, iRBG)$ can be expressed in several ways:

Expression 1: (9)

$$G_{\theta,\phi}(w_k, iRBG) = |h_{\theta,\phi}(:, 1:nTx) * w_k(1:nTx, iRBG)|^2$$

Expression 2: (10)

$$G_{\theta,\phi}(t)(w_k, iRBG)$$

$$= \left|h_{\theta,\phi}\left(\frac{nTx}{2}\right) * w_k\left(1:\frac{nTx}{2}, iRBG\right)\right|^2$$

$$+ \left|h_{\theta,\phi}\left(:, \frac{nTx}{2}+1:nTx\right) * w_k\left(\frac{nTx}{2}+1:nTx, iRBG\right)\right|^2$$

Expression 3: (11)

$$G_{\theta,\phi}(t)(w_k, iRBG)$$

$$= \left(\left|h_{\theta,\phi}\left(:, 1:\frac{nTx}{2}\right) * w_k\left(1:\frac{nTx}{2}, iRBG\right)\right|\right.$$

$$\left.+ \left|h_{\theta,\phi}\left(:, \frac{nTx}{2}+1:nTx\right) * w_k\left(\frac{nTx}{2}+1:nTx, iRBG\right)\right|\right)^2$$

Alternatively, to further reduce the computation complexity of the size of DU 410, an offline generated PMI to grid mapping table to compute the radiation power may be used. This solution computes the transmit power offline first. Once that is done, the radiation power for a given PMI may be mapped to different grids.

Figure 9:
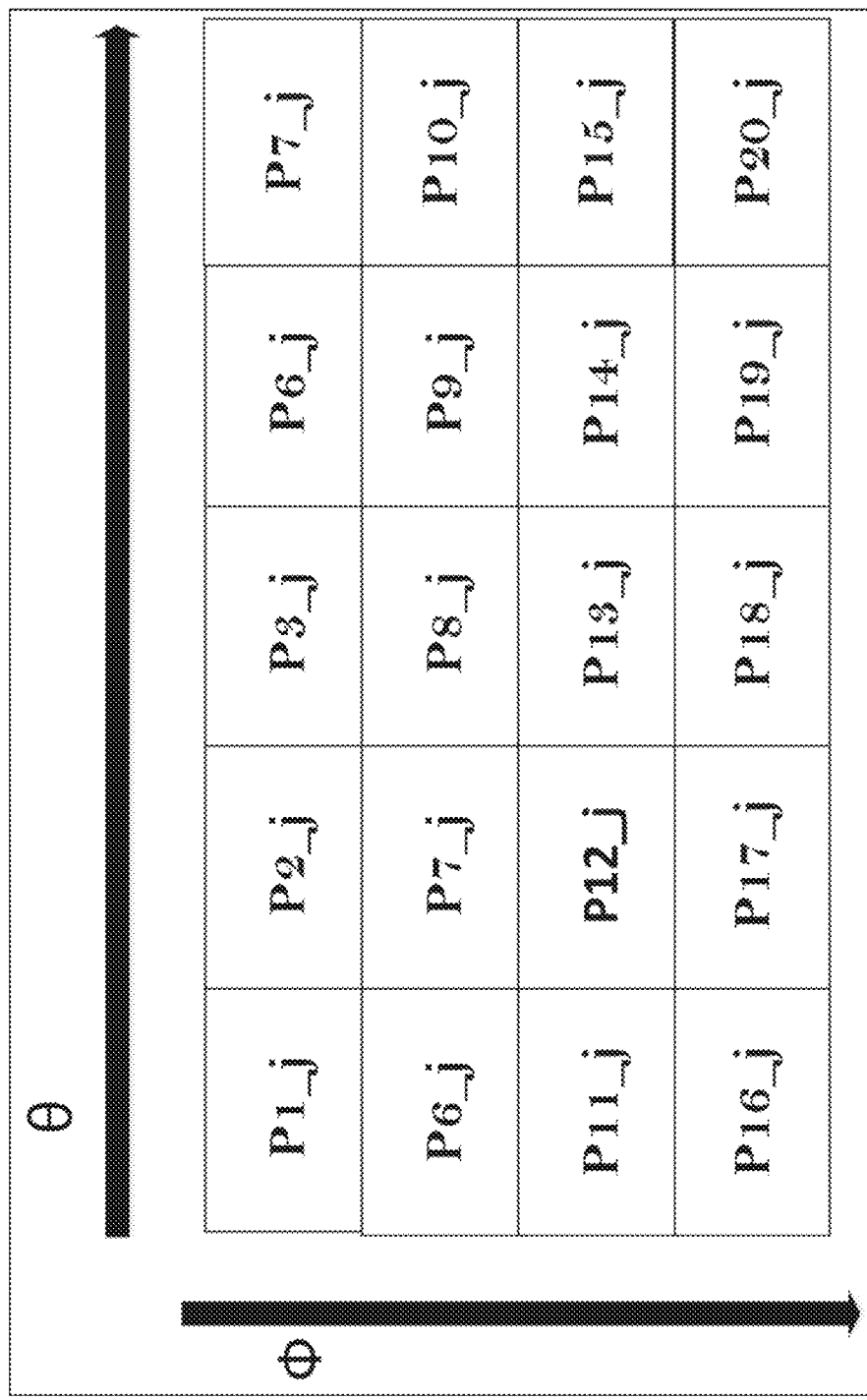
FIG. 9 illustrates an exemplary Radiation Power Table for PMI_j according to this disclosure.
Figure 10:
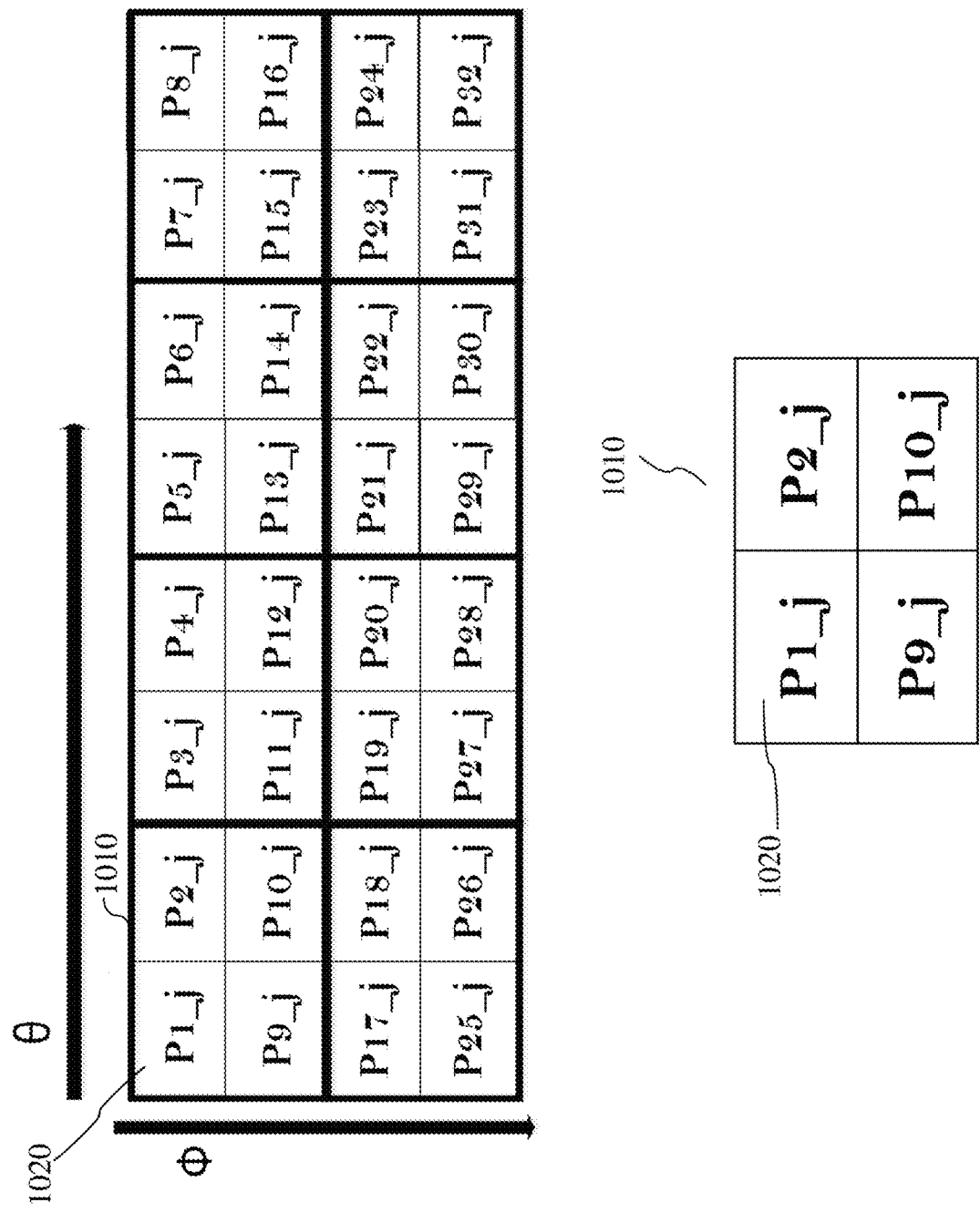
FIG. 10 illustrates an exemplary scenario with eight coarse grids, each consisting of four fine grids according to this disclosure.

FIG. 9 illustrates an exemplary Radiation Power Table for $PMI_1$ according to this disclosure. For example, if there are 1024 PMIs, there will be 1024 radiation power tables. DU 410 can simply use the radiation power table to find the radiation power on the grid m for a given $PMI_1$ Another approach may be to use multiple PMI to grid mapping strategies for power estimation methods in MU-MIMO systems. FIG. 10 illustrates an exemplary illustration of a precoder relationship before and after matrix generation and inversion. Given the potentially large number of PMIs, in order to reduce both the complexity and storage requirements of the DU side, several PMI to grid mapping strategies, which use a reduced number of coarse grids to compute an estimate of the radiated power, are disclosed.

This solution requires the offline mapping of every PMI to all antenna directions to be performed once. Once this is completed, multiple antenna directions with fine granularity, which are referred to as the fine grids in this disclosure, are grouped into coarse grids based on their proximity in (OM-domain. This will reduce the size of the PMI to grid mapping, due to the reduced number of grids. Next, instead of using the fine-grid PMI to grid mapping as described above with respect to FIG. 9, the reduced coarse-grid PMI to grid mapping can be used to estimate the radiated power in different antenna directions. An example scenario with four coarse grids, bounded by the thick black border and each having four fine grids, is illustrated in FIG. 10. For each PMI, the estimated radiated power for a coarse grid can be computed using several different mapping strategies. Several mapping strategies are described below.

For example, a max mapping strategy may be used. In this approach, given n fine grids in a coarse grid and n corresponding radiated power, the maximum radiated power among n fine grids is selected as the radiated power estimation of the coarse grid. For example, for the left uppermost coarse grid 1010, the estimated radiated power for PMI_j may be expressed as:

$$\max(P_1\_j, P_9\_j, P_{10}\_j) \quad (12)$$

An edge grid mapping strategy may also be used. In this approach, given n fine grids in a coarse grid and n corresponding radiated power, the radiated power at the fine grid which is located at the edge of its corresponding coarse grid is selected as the radiated power estimation of the coarse grid. For example, for the left uppermost coarse grid 1010, the estimated radiated power for $PMI_j$ $P_{i}\_j$, assuming that the left uppermost fine grid 1020 represents the radiated power in the coarse grid uppermost fine grid 1020 resides in.

Another mapping strategy is to use an average mapping strategy. In this approach, given n fine grids in a coarse grid and n corresponding radiated power, the average radiated power across n fine grids may be used as the radiated power estimation of the coarse grid. For example, for the left uppermost coarse grid 1010, the estimated radiated power for PMI_j is:

$$\sum_{i=1}^{4} P_{i}\_j \quad (13)$$

Another example of a mapping strategy that may be used is an X_percentile mapping strategy. Given n fine grids in a coarse grid and n corresponding radiated power, the X-th percentile of n radiated power values is used as the radiated power estimation of the coarse grid. FIG. 9 illustrates an exemplary scenario with eight course grids, each consisting of four fine grids. For example, for the left uppermost coarse grid 1010, the estimated radiated power for PMI with $X^{th}$ percentile may be computed as follows:

Without loss of generality, assume that $P_{ij} < P_{2j} < P_{9j} < P_{10}\_j$.
Then, $P_1\_j, P_2\_j, P_9\_j, P_{10}\_j$ are assigned to 12.5, 37.5, 62.5 and 87.5 percentile.
Then, linear interpolation is used for the percentiles in between.
For example, the 25th percentile is: $(P_1\_j + P_2\_j)/2$.

Figure 11:
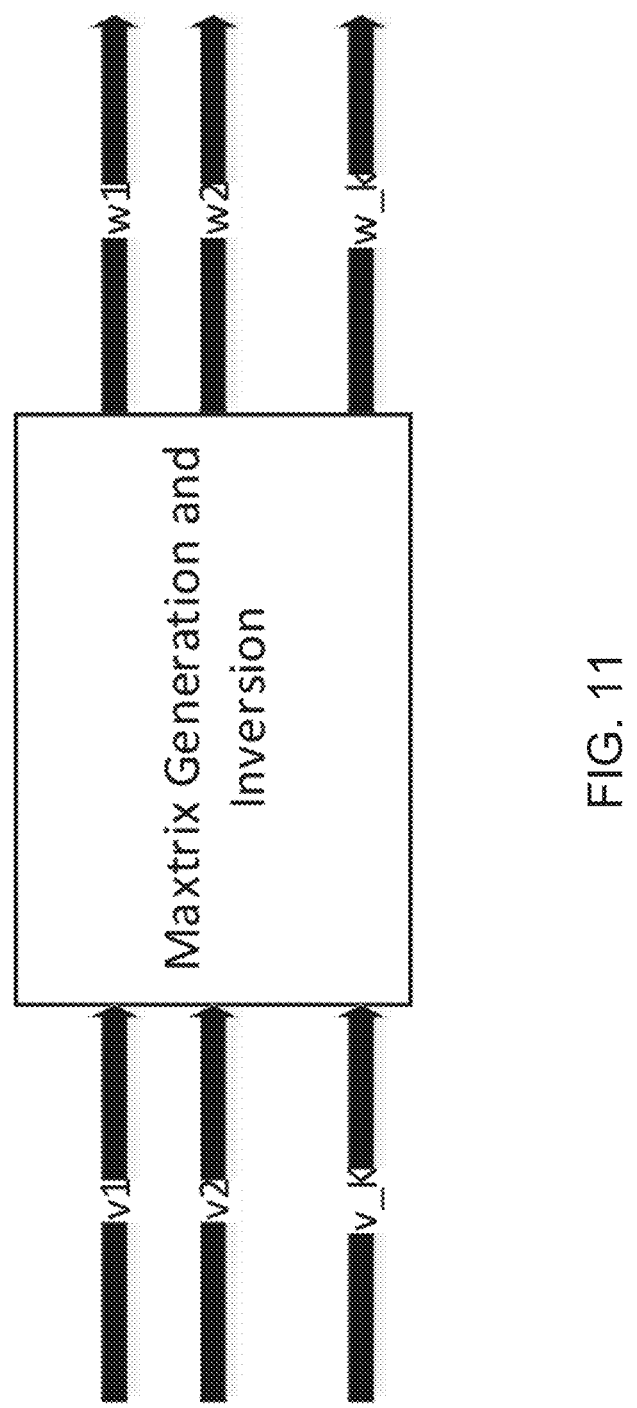
FIG. 11 illustrates an exemplary illustration of the precoder relationship before and after matrix generation and inversion according to this disclosure.

The following section describes estimating power in MU-MIMO systems with zero forcing. Due to some potential limitations with computation of power, the DU 410 site may not be able to perform a matrix inversion. In this scenario, the final precoder for MU-MIMO after zero forcing may not be known at the DU 410 site. To overcome this challenge, using a precoder before zero forcing as the input of the radiation power estimation is proposed. As indicated in FIG. 11, the precoder, before matrix inversion, is used as the input to calculate the radiation power. v1, v2, . . . vk are the scheduled PMIs or the scheduled UE channel conjugates for the MU-MIMO as described above in the power estimation in MU-MIMO without zero forcing.

The following section of this disclosure describes using a dynamic grid size and/or a dynamic grid change to estimate power in MU-MIMO systems.

Figures 12A, 12B:
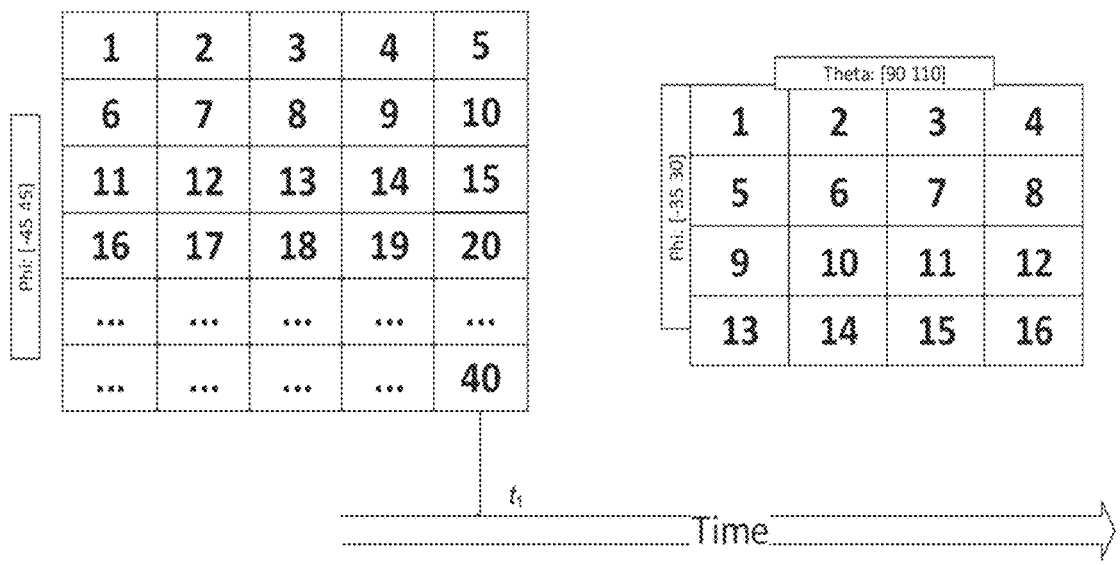
FIG. 12A illustrates an exemplary cell dependent grid size implementation according to this disclosure.
FIG. 12B illustrates a dynamic change of the grid size and range over time implementation according to this disclosure.

FIG. 12A illustrates an exemplary cell dependent grid size; i.e., the grid size is different from cell to cell. For example, cell 1 has 30 grids for marking the radiation power and cell 2 has 16 grids for marking the radiation power grid.

In a dynamic grid size approach, a non-fixed number of grids may be used in the power estimation. In other words, the number of grids used for power estimation can be changed over time, changed with different cells, or changed in another available way. For example, for a given cell, the number of grids used for the radiation power estimation can be changed over time. At a time, t, the number of grids used for the radiation power estimation can be different from cell to cell.

FIG. 12B illustrates the exemplary dynamic change of the grid size and range over time. In a dynamic grid range approach, the elevation and azimuth ranges of the grid can be changed over the time, changed with different cells, or changed in another available way. For example, for a given cell, the grid range used for the radiation power estimation can be changed with the time based on different criteria. The criteria may be UE channel state information (CSI) feedback, UE traffic, cell load, or any other appropriate criteria. At a time, t, the range of grid used for the radiation power estimation can be different from cell to cell. For example, UE traffic, UE feedback, etc.

For example, at a given time, ti the cell can have 40 grids with elevation angles (theta) ranging from 80 to 120 degree and azimuth angles (phi) ranging from −45 to 45 degree. At another time, the cell can have 30 grids with a smaller range, which are 90 to 110 degree of elevation and −35 to 30 degree of azimuth.

An alternative to grid-based power control method is to use number of scheduled layers as a proxy to power scaling. The reason is that when L layers are commonly scheduled, the power assigned to each layer would be 1/L of the total power. After ZF-precoding the transmit vectors are orthogonal. If they illuminate non-overlapping segments of the sector, it may be presumed that the maximum power received by any direction is maximum beam-gain divided by L. In one incarnation of the solution during power aggregation or averaging at TTI (t), the maximum power per sector may be $$\frac{P}{L_t} \frac{G_{PDSCH}(\max)}{4\pi d^2},$$

$L_t$ number of layers are commonly scheduled for SU or Mu transmission. The average power over a period of T transmissions may be given by:

$$P_m = \frac{1}{T} \sum_{t=1}^{T} \frac{P}{L_t} \frac{G_{PDSCH}(\max)}{4\pi d^2},$$

The final backoff factor would be calculated based on how much $P_m$ is larger than $P_{reg}$.

Figure 13:
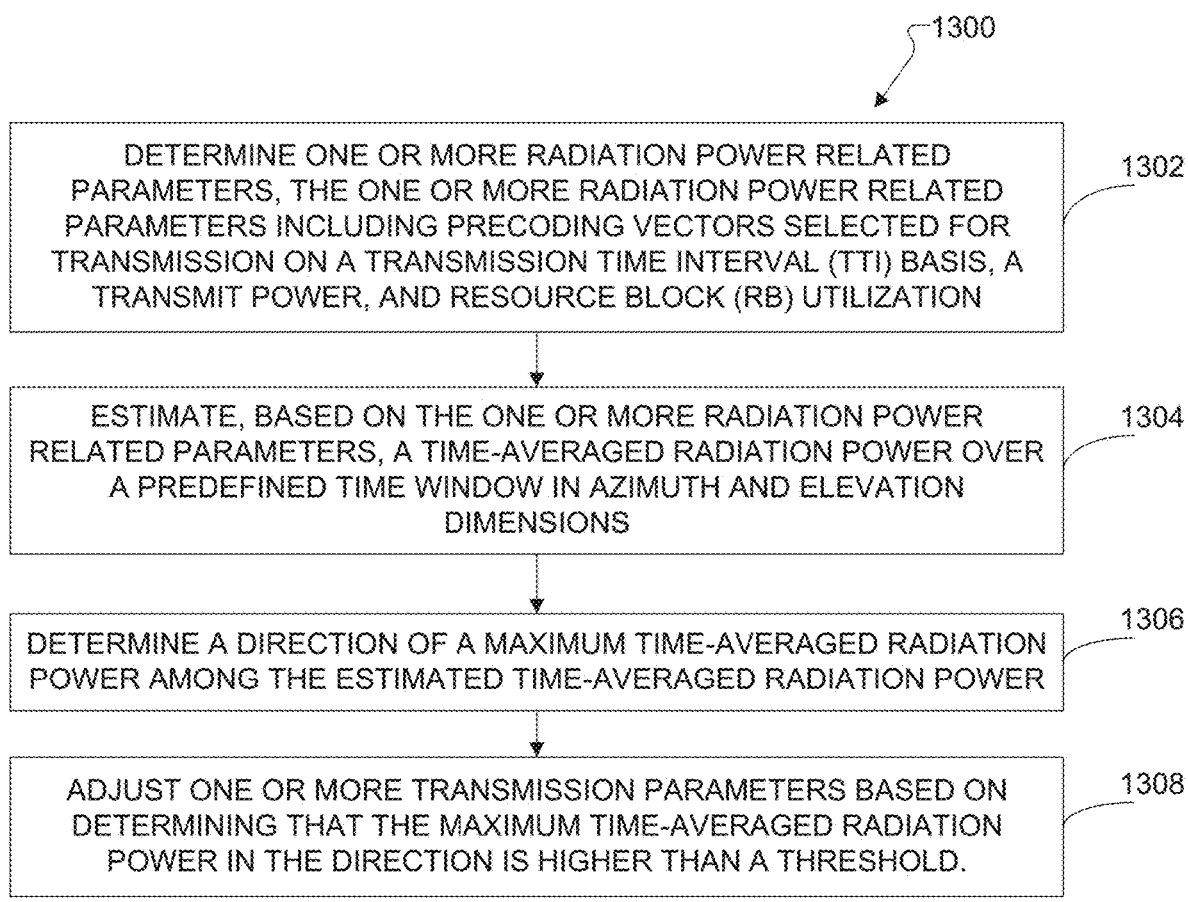
FIG. 13 illustrates an example process flowchart for complying with EMF exposure regulations.

FIG. 13 illustrates an example process flowchart 1300 for complying with EMF exposure regulations. the regulations of exposure to EMFs. The steps that follow may be performed by a base station, such as gNB 102, that can manage electromagnetic field (EMF) radiation in accordance with this disclosure. At step 1302, gNB 102 may determine one or more radiation power related parameters. The one or more radiation power related parameters may include precoding vectors selected for transmission on a transmission time interval (TTI) basis, a transmit power, and resource block (RB) utilization. At step 1304, gNB 102 may estimate, based on one or more radiation power related parameters, a time-averaged radiation power over a predefined time window in azimuth and elevation dimensions. For example, the time-averaged radiation power may be determined based in part on precoding vectors before zero forcing, a number of scheduled layers as a proxy to power scaling, or the layers in SU-MIMO as a proxy to power scaling. At step 1306, gNB 102 may determine a direction of a maximum time-averaged radiation power among the estimated time-averaged radiation power. At step 1308, gNB 102 may adjust one or more transmission parameters based on determining that the maximum time-averaged radiation power in the direction is higher than a threshold.

While this disclosure focuses on EMF, certain embodiments herein may be applied to any system in which received power optimization is required. For example, any system where received power at certain locations are restrictive. Certain embodiments of this disclosure may be applied in any case where the received power to a certain direction(s) needs to be estimated/predicted at a base station. In other words, this disclosure is not limited to the EMF domain.

This disclosure can be applied to any case that may need to improve the cell edge user performance or to mitigate the coverage hole. The disclosure can be used in places where MU-MIMO/SU-MIMO switch is required. The disclosure can be used for the optimization of MU-MIMO scheduling. The disclosure can also be used in any case that the enhanced scheduling of commonly scheduled layers/MCS/transmission power may be required.

Certain embodiments of this disclosure can also be applied to any case in which interference from the eNB/gNB needs to be controlled.

Certain embodiments of this disclosure may be applied to any case where the power estimation needs to be simplified for MU-MIMO implementations.

Certain embodiments of this disclosure can be applied in any case in which the radiation power restriction is required at any distance.

Certain embodiments of this disclosure can be applied in any case in which PMI to grid mapping is used for radiation power estimation.

Certain embodiments of this disclosure may be applied in the transmission power control for MU-MIMO implementations.

It should be noted that the illustrated regions of the figures are merely examples. Also, it should be noted that although the above illustrations are shown in two dimensions, the zones are often three dimensional. It also should be noted that for clarity and ease of illustration, the figures are not necessarily made to scale.

While the above detailed diagrams have shown, described, and pointed out novel features of the present disclosure as applied to various embodiments, it will be understood that various omissions, substitutions, and changes in the form and details of the device or process illustrated may be made by those skilled in the art without departing from the present disclosure. This description is in no way meant to be limiting, but rather should be taken as illustrative of the general principles of the present disclosure.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station for managing electromagnetic field (EMF) radiation in a wireless communication system, the base station comprising:
    a transceiver; and
    a processor operably connected to the transceiver; the processor configured to:
        determine one or more radiation power related parameters, the one or more radiation power related parameters including precoding vectors selected for transmission on a transmission time interval (TTI) basis, a transmit power, and resource block (RB) utilization;
        estimate, based on the one or more radiation power related parameters, a time-averaged radiation power over a predefined time window in azimuth and elevation dimensions;
        determine a direction of a maximum time-averaged radiation power among the estimated time-averaged radiation power; and
        adjust one or more transmission parameters based on determining that the maximum time-averaged radiation power in the direction is higher than a threshold.

2. The base station of claim 1, wherein to adjust the one or more transmission parameters, the processor is further configured to one of:
    (a) reduce a transmit power to a plurality of electronic devices by a percentage that is based on the threshold; or
    (b) classify the plurality of electronic devices into groups, wherein different power reduction levels are applied to different groups of electronic devices, based on one or more threshold criteria, wherein the one or more threshold criteria includes one or more of offered traffic size, an initial block error rate (iBLER), a data rate, a reported channel quality indication (CQI), and a reference signal received power (RSRP); and
        reduce the transmit power to a first of the groups of electronic devices by a percentage that is based in part on the threshold while maintaining the transmit power to a second of the groups; or
    (c) switch from a multi-user, multiple-input and multiple output (MU-MIMO) mode to a single-user, multiple-input and multiple output (SU-MIMO) mode.

3. The base station of claim 1, wherein to adjust the one or more transmission parameters, the processor is further configured to:
    reduce a transmit power in the direction to a first group of electronic devices by a percentage that is based on one or more threshold criteria for a predefined time window;
    after reducing the transmit power, determine whether the radiation power in the direction is higher than the threshold; and
    in response to determining that the radiation power in the direction is higher than the threshold, reduce the transmit power in the direction to a second group of electronic devices for the predefined time window.

4. The base station of claim 1, wherein to adjust the one or more transmission parameters, the processor is further configured to:
    (a) reduce resource block group (RBG) utilization to a plurality of electronic devices for TTIs; or
    (b) classify the plurality of electronic devices into groups based on device performance criteria including at least one of error rate, data rate, reported channel quality, and reported signal power; and
        reduce RBG utilization at scheduled TTIs for a first of the groups while maintaining RBG allocation to a second of the groups.

5. The base station of claim 1, wherein the processor is further configured to:
    identify a number of electronic devices being commonly scheduled that belong to a first group of electronic devices; and
    in response to determining that the number of electronic devices belonging to the first group of electronic devices is greater than a threshold:
    apply a restricted RB allocation or a power reduction to all the electronic devices that are commonly scheduled; or
    apply the restricted RB allocation or a power reduction to a first group of electronic devices that are commonly scheduled, while maintaining RB allocation or power allocation for a second group, wherein the first group of electronic devices belong to the commonly scheduled group of electronic devices.

6. The base station of claim 1, wherein to adjust the one or more transmission parameters, the processor is further configured to:
    classify a plurality of electronic devices into groups based on radiation power in the direction; and
    reduce the transmit power for a first group of electronic devices in the direction while maintaining the transmit power in other directions.

7. The base station of claim 1, wherein the processor is further configured to:
    determine whether the maximum time-averaged radiation power meets the threshold by one of:
    determine a backoff factor for a time period based on the maximum time-averaged radiation power in the azimuth and elevation dimensions for a plurality of time periods; or
    determine a backoff parameter for a time period based on determining an average transmit power over multiple time periods.

8. The base station of claim 1, wherein to estimate the time-averaged radiation power over a predefined time window in the azimuth and elevation dimensions comprises:
    determine the transmit power; and
    map a precoding matrix indicator (PMI) to the radiation power on grids based on a radiation power table, wherein the mapping comprises at least one of:
    select the maximum radiated power among a plurality of fine grids,
    select the radiated power at the fine grid located at the of its corresponding course grid, select an average radiated power across a plurality of fine grids; and select a percentile of radiated power values based on a plurality of fine grids.

9. The base station of claim 8, wherein a number of grids used for the radiation power estimation changes based on at least one parameter, wherein the at least one parameter comprises one or more of user equipment (UE) channel state information (CSI) feedback, UE traffic, and cell load; or wherein the elevation and azimuth ranges of the grid can be changed based on at least one parameter.

10. The base station of claim 1, wherein to estimate the time-averaged radiation power over a predefined time window in the azimuth and elevation dimensions, the processor is further configured to one of:

determine the radiation power based in part on precoding vectors before zero forcing;

determine the radiation power based on a number of scheduled layers as a proxy to power scaling; or determine the radiation power based on layers in single-user, multiple-input and multiple output (SU-MIMO) as the proxy to power scaling.

11. A method for managing electromagnetic field (EMF) radiation, the method comprising:

determining one or more radiation power related parameters, the one or more radiation power related parameters including precoding vectors selected for transmission on a transmission time interval (TTI) basis, a transmit power, and resource block (RB) utilization;

estimating, based on the one or more radiation power related parameters, a time-averaged radiation power over a predefined time window in azimuth and elevation dimensions;

determining a direction of a maximum time-averaged radiation power among the estimated time-averaged radiation power; and adjusting one or more transmission parameters based on determining that the maximum time-averaged radiation power in the direction is higher than a threshold.

12. The method of claim 11, wherein adjusting the one or more transmission parameters comprises one of:

(a) reducing a transmit power to a plurality of electronic devices by a percentage that is based on the threshold; or (b) classifying the plurality of electronic devices into groups, wherein different power reduction levels are applied to different groups of electronic devices based on one or more threshold criteria, wherein the one or more threshold criteria includes one or more of offered traffic size, an initial block error rate (iBLER), a data rate, a reported channel quality indication (CQI), and a reference signal received power (RSRP); and reducing the transmit power to a first of the groups of electronic devices by a percentage that is based in part on the threshold while maintaining the transmit power to a second of the groups; or (c) switching from a multi-user, multiple-input and multiple output (MU-MIMO) mode to a single-user, multiple-input and multiple output (SU-MIMO) mode.

13. The method of claim 11, wherein adjusting the one or more transmission parameters comprises:

reducing a transmit power in the direction to a first group of electronic devices by a percentage that is based on one or more threshold criteria for a predefined time window;

after reducing the transmit power, determining whether the radiation power in the direction is higher than the threshold; and in response to determining that the radiation power in the direction is higher than the threshold, reducing the transmit power in the direction to a second group of electronic devices for the predefined time window.

14. The method of claim 11, wherein adjusting the one or more transmission parameters comprises:

(a) reducing resource block group (RBG) utilization to a plurality of electronic devices for TTIs; or (b) classifying the plurality of electronic devices into groups based on device performance criteria including at least one of error rate, data rate, reported channel quality, and reported signal power; and reducing RBG utilization at scheduled TTIs for a first of the groups while maintaining RBG allocation to a second of the groups.

15. The method of claim 11, further comprising:

identifying a number of electronic devices being commonly scheduled that belong to a first group of electronic devices; and in response to determining that the number of electronic devices belonging to a first group of electronic devices is greater than a threshold;

applying a restricted RB allocation or a power reduction to all the electronic devices that are commonly scheduled; or apply the restricted RB allocation or a power reduction to a first group of electronic devices that are commonly scheduled, while maintaining RB allocation or power allocation for a second group, wherein the first group of electronic devices belong to the commonly scheduled group of electronic devices.

16. The method of claim 11, wherein adjusting the one or more transmission parameters comprises:

classifying a plurality of electronic devices into groups based on radiation power in the direction; and reducing the transmit power for a first group of electronic devices in the direction while maintaining the transmit power in other directions.

17. The method of claim 11, further comprising:

determining whether the maximum time-averaged radiation power meets the threshold by one of:

determining a backoff factor for a time period based on the maximum time-averaged radiation power in the azimuth and elevation dimensions for a plurality of time periods; or determining a backoff parameter for a time period based on determining an average transmit power over multiple time periods.

18. The method of claim 11, wherein estimating the time-averaged radiation power over a predefined time window in the azimuth and elevation dimensions comprises:

determining the transmit power; and mapping a precoding matrix indicator (PMI) to the radiation power on grids based on a radiation power table, wherein the mapping comprises at least one of:

selecting the maximum radiated power among a plurality of fine grids, selecting the radiated power at the fine grid located at the of its corresponding course grid, selecting an average radiated power across a plurality of fine grids; and selecting a percentile of radiated power values based on a plurality of fine grids.

19. The method of claim 18, wherein a number of grids used for the radiation power estimation changes based on at least one parameter, wherein the at least one parameter comprises one or more of user equipment (UE) channel state information (CSI) feedback, UE traffic, and cell load; or
wherein the elevation and azimuth ranges of the grid can be changed based on at least one parameter.

20. The method of claim 11, wherein estimating the time-averaged radiation power over a predefined time window in the azimuth and elevation dimensions comprises one of:
determining the radiation power based in part on precoding vectors before zero forcing;
determining the radiation power based on a number of scheduled layers as a proxy to power scaling; and
determining the radiation power based on layers in single-user, multiple-input and multiple output (SU-MIMO) as the proxy to power scaling.

* * * * *